(12) United States Patent
Lau

(10) Patent No.: US 6,861,775 B2
(45) Date of Patent: Mar. 1, 2005

(54) ELECTRIC MOTOR

(75) Inventor: James Ching Sik Lau, Hong Kong (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 10/321,354

(22) Filed: Dec. 18, 2002

(65) Prior Publication Data

US 2003/0111919 A1 Jun. 19, 2003

(30) Foreign Application Priority Data

Dec. 18, 2001 (GB) .............................................. 0130147

(51) Int. Cl.$^7$ ................................................ H02K 7/00
(52) U.S. Cl. ........................ 310/71; 310/68 B; 310/89
(58) Field of Search ................................ 310/68 B, 89, 310/71

(56) References Cited

U.S. PATENT DOCUMENTS

| | | | | |
|---|---|---|---|---|
| 3,967,200 A | | 6/1976 | Tetsugu et al. ............. 324/173 |
| 4,049,984 A | * | 9/1977 | Ishii et al. ..................... 310/42 |
| 4,827,175 A | * | 5/1989 | Kobayashi .................. 310/268 |
| 4,829,254 A | * | 5/1989 | Baines ........................ 324/167 |
| 4,933,582 A | * | 6/1990 | Hata et al. ............. 310/154.14 |
| 5,013,946 A | * | 5/1991 | Sata ...................... 310/40 MM |
| 5,070,269 A | | 12/1991 | Tamaki et al. ............... 310/171 |
| 5,086,243 A | | 2/1992 | Hofmann ................... 310/68 B |
| 5,124,602 A | * | 6/1992 | Nishimura et al. ........ 310/68 B |
| 5,155,401 A | * | 10/1992 | Kanaya et al. ................. 310/89 |
| 5,326,235 A | * | 7/1994 | Bruhn ...................... 417/410.1 |
| 5,614,775 A | * | 3/1997 | Horski et al. ............. 310/68 R |
| 6,218,750 B1 | * | 4/2001 | Nakagawa ................ 310/68 B |
| 6,417,587 B1 | * | 7/2002 | Komatsu et al. .......... 310/68 B |

FOREIGN PATENT DOCUMENTS

| | | |
|---|---|---|
| EP | 0 915 555 A1 | 5/1999 |
| FR | 2 580 439 | 10/1986 |
| GB | 1 485 524 A | 9/1977 |
| GB | 2 228 146 A | 8/1990 |

OTHER PUBLICATIONS

Patent Abstracts of Japan, vol. 14, No. 67 (E–0885), Feb. 7, 1990 (Publication No. 01286751, Nov. 17, 1989).

* cited by examiner

*Primary Examiner*—Dang Le
(74) *Attorney, Agent, or Firm*—Birch, Stewart, Kolasch & Birch, LLP

(57) ABSTRACT

A PMDC motor 10 with a speed sensor 20 has a cup-like deep drawn rear housing 18 and an end cap 16. The speed sensor 20 is located on an inner surface of the end cap 16 and has a coil connected to two terminals of a connector 23 mounted on a brush plate 21 of the end cap 16. The connector 23 is aligned with a window 26 in the rear housing 18.

11 Claims, 1 Drawing Sheet

ELECTRIC MOTOR

This invention relates to electric motors and in particular, to a PMDC motor with a speed sensor.

Known speed sensors for PMDC motors use a coil to pick up electromagnetic signals emitted by the motor as the rotor turns. Known arrangements generally mount the sensor coil in the field magnet or in the space between adjacent magnets, resulting in a complex structure or assembly.

The present invention provides a PMDC motor with a speed sensor in which the coil is conveniently located.

Accordingly, the present invention provides a PMDC motor comprising: a shaft; a rotor core mounted on the shaft; a commutator mounted on the shaft adjacent the rotor core; windings wound about the rotor core and terminated on the commutator; a permanent magnet stator having at least one magnet confronting the rotor core; a housing supporting the stator; an end cap fixed to the housing and supporting: motor terminals; brush gear in sliding contact with the commutator for transferring electrical power from the motor terminals to the windings; and a speed sensor, wherein the speed sensor comprises a sensor coil fixed to the base plate and sensor terminals fixed to the end cap for connecting the sensor coil to external lead wires.

Preferred and/or optimal features are defined in the dependent claims.

Figure 1:
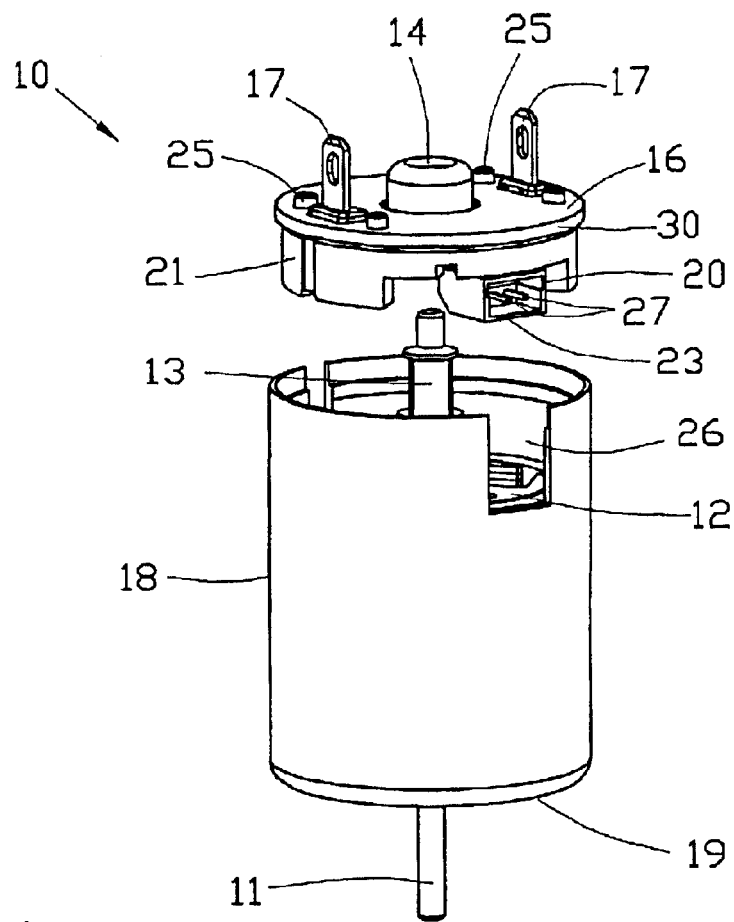
Figure 2:
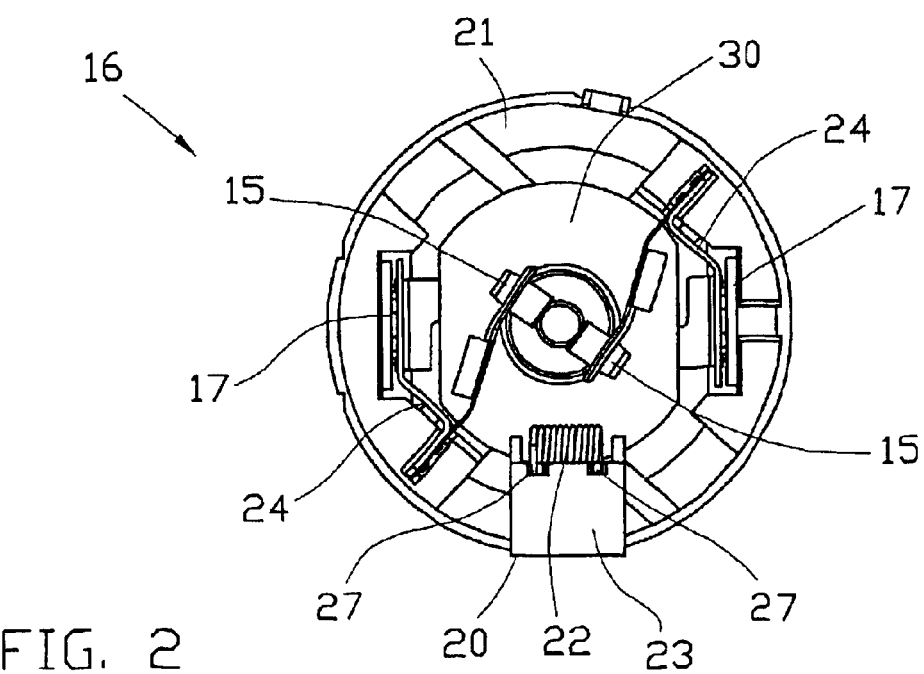

One preferred embodiment of the present invention will now be described, by way of example only, with reference to the accompanying drawings, in which:

FIG. 1 is a view of a partially assembled PMDC motor according to the preferred embodiment; and FIG. 2 is an isometric view of an end cap forming a part of the motor of FIG. 1.

Referring to FIG. 1, there is shown a partially assembled PMDC motor 10. The motor 10 has a housing in the form of a deep drawn rear housing 18 having one closed end forming an end wall 19 and one open end. The open end is closed by an end cap 16 which supports brush gear 15 (FIG. 2) and motor terminals 17. A permanent magnet stator (not clearly visible) is formed by a ring magnet of the rubber strip type fitted to an inner circumferential surface of the rear housing 18 and confronts, across a small gap, a rotor. The rotor has a shaft 11, a rotor core 12 and a commutator 13. Windings (not shown) are wound about the core and terminated on the commutator 13. The brushes 15 of the end cap 16 engage the commutator 13 to pass electrical power from the motor terminals 17 to the rotor windings to operate the motor. The shaft 11 is journalled in a bearing located in a bearing hub 14 of the end cap 16 and in a bearing supported by the end wall 19 of the rear housing 18.

Located on an inner surface of the end cap 16 is a speed sensor 20. In FIG. 1, only the connector 23 for the speed sensor is visible. The connector 23 is accessible externally of the motor 10 through a window or cut out 26 in the rear housing 18.

The sensor 20 is more clearly shown in FIG. 2. FIG. 2 is an underside plan view of the end cap 16. The end cap 16 has a metal disc 30 which sits, in use, on a ledge just inside the open end of the rear housing 18. The open end of the housing is then crimped to fix the end cap in place. The motor terminals 17 extend through the disc 30 for connection to motor power leads. Fixed to the inside surface of the disc 30 is an annular insulator or brush plate 21 of molded resin construction. As shown in FIG. 2, the brushes 15 are held in slots formed in the brush plate 21 by brush holders 24 which also make contact with the motor terminals 17 thereby electrically connecting the brushes to the motor terminals.

The brush plate 21 thus supports both the brushes 15 and the motor terminals 17 while insulating them from the metal disc 30. Posts 25 integral with the brush plate 21 project through holes in the metal disc 30 and are then deformed to fix the brush plate 21 to the metal disc 30.

Referring to FIG. 2, the speed sensor comprises a sensor coil 22 and a connector 23. The coil 22 is soldered directly across two terminals on the back of the connector, forming a part of the sensor terminals 27 of the connector. The connector is fixed to the brush plate by suitable means such as gluing but the preferred connector has mounting pins (not shown) which extend from the base of the connector and are pressed into holes in the brush plate 21, thereby fixing the speed sensor 20 to the end cap 16.

The coil 22 may be any suitable coil with or without a core, including a chip-type coil. However, the preferred coil is a helical coil of enamel insulated single strand copper wire wound about a steel pin core and varnished for strength and integrity. The steel pin core concentrates and thus amplifies the electromagnetic signals picked up by the coil. Thus it may be useful in applications where the strength of the monitored signal is very low.

The thus described motor incorporates a speed sensor which is conveniently located, easy to install and provides a good pick up of the electromagnetic emissions from the armature windings.

The embodiment described above is given by way of example only and various modifications will be apparent to persons skilled in the art without departing from the scope of the invention as defined in the appended claims. For example, the coil may be located about a post on the brush plate or the steel pin may be directly mounted to the brush plate. Also, the connector could be formed as an integral part of the brush plate and the brush holders, while described as separate items, may be formed integrally with the motor terminals.

What is claimed is:

1. A PMDC motor comprising:

a shaft;

a rotor core mounted on the shaft;

a commutator mounted on the shaft adjacent the rotor core;

windings wound about the rotor core and terminated on the commutator;

a permanent magnet stator having at least one magnet confronting the rotor core;

a housing supporting the stator;

an end cap fixed to the housing and supporting:

motor terminals;

brush gear in sliding contact with the commutator for transferring electrical power from the motor terminals to the windings; and a speed sensor, wherein the speed sensor comprises a sensor coil and sensor terminals fixed to the end cap and accessible through a wall of the housing for connecting the sensor coil to external lead wires and the sensor coil is arranged to generate an electrical signal indicative of fluctuations in an electromagnetic field produced by the windings of the rotor as the rotor rotates.

2. The motor of claim 1, wherein the housing comprises a deep drawn rear housing having a closed end and an open end, and the end cap closes the open end of the rear housing; and the speed sensor is located within the rear housing fixed to an inner surface of the end cap.

3. The motor of claim 2, wherein the rear housing has a cut away portion allowing external access to the sensor terminals.

4. The motor of claim 1, wherein the end cap comprises a metal disc fixed to an insulating brush plate and the speed sensor is mounted on the brush plate.

5. The motor of claim 1, wherein the speed sensor further comprises a connector housing the sensor terminals for receiving a lead wire plug and the connector is mounted to the end cap and the sensor coil is soldered directly to the sensor terminals.

6. The motor of claim 1, wherein the coil has a steel core.

7. The motor of claim 6, wherein the coil is fixed to the end cap by the steel core.

8. The motor of claim 1, wherein the coil is a chip-type coil.

9. The motor of claim 1, wherein the end cap comprises a metal disc fixed to a molded insulating brush plate, the brush plate is formed with an integral connector housing the sensor terminals and is adapted to receive a plug for connecting the speed sensor terminals to the external lead wires.

10. A PMDC motor comprising:

a shaft;

a rotor core mounted on the shaft;

a commutator mounted on the shaft adjacent the rotor core;

windings wound about the rotor core and terminated on the commutator;

a permanent magnet stator having at least one magnet confronting the rotor core;

a housing supporting the stator including a rear housing having a closed end and an open end, with an end cap closing the open end;

an end cap fixed to the housing and supporting:

motor terminals;

brush gear in sliding contact with the commutator for transferring electrical power from the motor terminals to the windings; and a speed sensor, wherein the speed sensor comprises a sensor coil and sensor terminals fixed to the end cap for connecting the sensor coil to external lead wires and the sensor coil is arranged to generate an electrical signal indicative of fluctuations in an electromagnetic field produced by the windings of the rotor as the rotor rotates wherein the rear housing has a cutaway portion allowing external access to the sensor terminals.

11. A PMDC motor comprising:

a shaft;

a rotor core mounted on the shaft;

a commutator mounted on the shaft adjacent the rotor core;

windings wound about the rotor core and terminated on the commutator;

a permanent magnet stator having at least one magnet confronting the rotor core;

a housing supporting the stator;

an end cap fixed to the housing and supporting:

motor terminals;

brush gear in sliding contact with the commutator for transferring electrical power from the motor terminals to the windings; and a speed sensor, wherein the speed sensor comprises a sensor coil and sensor terminals fixed to the end cap for connecting the sensor coil to external lead wires and the sensor coil is arranged to generate an electrical signal indicative of fluctuations in an electromagnetic field produced by the windings of the rotor as the rotor rotates;

wherein the end cap comprises a metal disc fixed to a molded insulating brush plate, the brush plate is formed with an integral connector housing the sensor terminals and is adapted to receive a plug for connecting the speed sensor terminals to the external lead wires.

* * * * *